United States Patent
Bar

(10) Patent No.: US 11,776,243 B2
(45) Date of Patent: Oct. 3, 2023

(54) SYSTEMS AND METHODS FOR AUTOMATED DETECTION OF VISUAL OBJECTS IN MEDICAL IMAGES

(71) Applicant: Nano-X AI Ltd., Shefayim (IL)

(72) Inventor: Amir Bar, Berkeley, CA (US)

(73) Assignee: Nano-X AI Ltd., Shefayim (IL)

( * ) Notice: Subject to any disclaimer, the term of this patent is extended or adjusted under 35 U.S.C. 154(b) by 232 days.

(21) Appl. No.: 17/260,268

(22) PCT Filed: Jun. 27, 2019

(86) PCT No.: PCT/IL2019/050714
§ 371 (c)(1),
(2) Date: Jan. 14, 2021

(87) PCT Pub. No.: WO2020/026223
PCT Pub. Date: Feb. 6, 2020

(65) Prior Publication Data
US 2021/0295108 A1   Sep. 23, 2021

Related U.S. Application Data

(60) Provisional application No. 62/711,535, filed on Jul. 29, 2018.

(51) Int. Cl.
*G06V 10/82* (2022.01)
*G06T 7/62* (2017.01)
(Continued)

(52) U.S. Cl.
CPC ............ *G06V 10/82* (2022.01); *G06F 18/214* (2023.01); *G06F 18/24* (2023.01); *G06T 7/11* (2017.01);
(Continued)

(58) Field of Classification Search
CPC .................................................. G06K 9/6267
See application file for complete search history.

(56) References Cited

U.S. PATENT DOCUMENTS

| 2008/0292194 A1 | 11/2008 | Schmidt et al. |
| 2016/0196648 A1 | 7/2016 | Madabhushi et al. |

(Continued)

FOREIGN PATENT DOCUMENTS

WO   WO 2020/026223   2/2020

OTHER PUBLICATIONS

Supplementary European Search Report and the European Search Opinion dated Mar. 10, 2022 From the European Patent Office Re. Application No. 19843638.8. (12 Pages).
(Continued)

*Primary Examiner* — Oneal R Mistry

(57) ABSTRACT

There is provided a computer implemented method for identification of an indication of visual object(s) in anatomical image(s) of a target individual, comprising: providing anatomical image(s) of a body portion of a target individual, inputting the anatomical image(s) into a classification component of a neural network (NN) and into a segmentation component of the NN, feeding a size feature into the classification component of the NN, wherein the size feature comprises an indication of a respective size of each segmented visual object identified in the anatomical image(s), the size feature computed according to segmentation data outputted by the segmentation component for each pixel element of the anatomical image(s), and computing, by the classification component of the NN, an indication of visual object(s) in the anatomical image(s).

16 Claims, 9 Drawing Sheets

(51) Int. Cl.
    *G06T 7/11*     (2017.01)
    *G06F 18/24*    (2023.01)
    *G06F 18/214*   (2023.01)
    *G06V 10/764*   (2022.01)

(52) U.S. Cl.
    CPC .............. *G06T 7/62* (2017.01); *G06V 10/764* (2022.01); *G06T 2207/10081* (2013.01); *G06T 2207/20084* (2013.01); *G06T 2207/30008* (2013.01); *G06T 2207/30028* (2013.01); *G06T 2207/30052* (2013.01); *G06T 2207/30096* (2013.01); *G06T 2207/30101* (2013.01); *G06V 2201/032* (2022.01)

(56) References Cited

U.S. PATENT DOCUMENTS

| | | | |
|---|---|---|---|
| 2017/0344808 | A1 | 11/2017 | El-Khamy et al. |
| 2018/0177461 | A1 | 6/2018 | Bell et al. |
| 2020/0226748 | A1* | 7/2020 | Kaufman .............. G06F 18/254 |
| 2020/0286614 | A1* | 9/2020 | Do .......................... G06N 7/01 |
| 2020/0410674 | A1* | 12/2020 | Koch ................... A61B 5/7267 |

OTHER PUBLICATIONS

Anbeek et al. "Probabilistic Brain 'Tissue Segmentation in Neonatal Magnetic Resonance Imaging", Pediatric Research, 62(2): 158-163, XP55463037A, Feb. 1, 2008.
De Bressere et al. "A Comparison of MR Based Segmentation Methods for Measuring Brain Arophy Progression", NeuroImage, 54(2): 760-768. XP537683A, Jan. 15, 2011.
International Preliminary Report on Patentability dated Feb. 11, 2021 From the International Bureau of WIPO Re. Application No. PCT/IL2019/050714. (9 Pages).
International Search Report and the Written Opinion dated Nov. 27, 2019 From the International Searching Authority Re. Application No. PCT/IL2019/050714. (18 Pages).
Bar et al. "Compression Fractures Detection on CT", Medical Imaging 2017: Computer-Aided Diagnosis, Proceedings of the SPIE, Orlando, Florida, USA, Mar. 3, 2017, 10134: 1013440-1-1013440-8, Mar. 3, 2017.
Bar et al. "Improved ICH Classification Using Task-Dependent Learning", BloodNet, Zebra Medical Vision Inc., 5 P., 2018.
Brestel et al. "RadBot-CXR: Classification of Four Clinical Finding Categories in Chest X-Ray Using Deep Learning", 1st Conference on Medical imaging With Deep Learning, M1DL 2018, Amsterdam, The Netherlands, Jun. 4-6, 2018, p. 1-9, Feb. 18, 2018.
Chilamkurthy et al. "Development and Validation of Deep Learning Algorithms for Detection of Critical Findings in Head CT Scans", arXiv Preprint arXiv: 1803.05854v2: 1-18, Apr. 12, 2018.
Grewal et al. "RadNet: Radiologist Level Accuracy Using Deep Learning for Hemorrhage Detection in CT Scans", 2018 IEEE 15th International Symposium on Biomedical Imaging, ISBI 2018, Washington, D.C., USA, Apr. 4-7, 2018. p. 281-284, Apr. 4, 2018.
He et al. "Deep Residual Learning for Image Recognition", Proceedings of the IEEE Conference on Computer Vision and Pattern Recognition, CVPR 2016, Las Vagas, NV, USA, Jun. 27-30, 2016, p. 770-778, Jun. 27, 2016.
He et al. "Mask R-CNN", 2017 IEEE International Conference on Computer Vision, ICCV, Venice, Italy, Oct. 22-29, 2017, p. 2980-2988, Oct. 22, 2017.
Hochreiter et al. "Long Short-Term Memory", Neural Computation, 9(8): 1735-1780, Nov. 15, 1997.
Ji et al. "3D Convolutional Neural Networks for Human Action Recognition", IEEE Transactions on Pattern Analysis and Machine Intelligence, 35(1): 221-231, Published Online Feb. 28, 2012.
Jnawali et al. "Deep 3D Convolution Neural Network for CT Brain Hemorrhage Classification", Medical imaging 2018: Computer-Aided Diagnosis, Proceedings of the SPIE Medical Imaging 2018, Houston, Texas, USA, Feb. 27, 2018, 10575: 105751C-1-105751C-7, Feb. 27, 2018.
Laserson et al. "TextRay: Mining Clinical Reports to Gain a Broad Understanding of Chest X-Rays", arXiv Preprint arXiv:1806.02121v1: 1-13, Jun. 6, 2018.
Ronneberger et al. "U.-Net: Convolutional Networks for Biomedical Image Segmentation", International Conference on Medical Image Computing and Computer-Assisted Intervention, MICCAI 2015, Part III, LNCS 9351: 234-241, Nov. 18, 2015, arXiv Preprint arXiv: 1505.04597v1: 1-8, May 18, 2015.
Salvador et al. "Recurrent Neural Networks for Semantic Instance Segmentation". ArXiv Preprint ArXiv:1712.00617v1, p. 4321-4329, Dec. 2, 2017.
Shadmi et al. "Fully-Convolutional Deep-Learning Based-System for Coronary Calcium Score Prediction From Non-Contrast Chest CT", 2018 IEEE 15th International Symposium on Biomedical Imaging, ISBI 2018, Washington, D.C., USA, Apr. 4-7, 2018, p. 24-28, Apr. 4, 2018.
Shakeri et al. "Prior-Based Coregistration and Cosegmentation", International Conference on Medical Image Computing and Computer-Assisted Intervention, MICCAI 2016, Athens, Greece, Oct. 17-21, 2016, 9901: 529-537, Oct. 17, 2016.
Zhang "Improving Semantic Image Segmentation by Object Localization", A Thesis Submitted in Partial Fulfillment of the Requirements for the Degree of Master of Science, Department of Computing Science, University of Alberta, Canada, p. 1-51, 2017.

\* cited by examiner 502A    502B    502C

SYSTEMS AND METHODS FOR AUTOMATED DETECTION OF VISUAL OBJECTS IN MEDICAL IMAGES

RELATED APPLICATIONS APPLICATION

This application is a National Phase of PCT Patent Application No. PCT/IL2019/050714 having International filing date of Jun. 27, 2019, which claims the benefit of priority under 35 USC § 119(e) of U.S. Provisional Patent Application No. 62/711,535 filed on Jul. 29, 2018. The contents of the above applications are all incorporated by reference as if fully set forth herein in their entirety.

FIELD AND BACKGROUND OF THE INVENTION

The present invention, in some embodiments thereof, relates to medical image processing and, more specifically, but not exclusively, to systems and methods for automated detection of visual objects in medical images.

Visual objects indicative of clinical pathology are found in imaging studies. The imaging study may be performed with the goal of looking for the visual object, and/or the visual object may be an incidental finding. For example, intracranial hemorrhage (ICH) is a critical finding seen in various clinical circumstances spanning major trauma to sudden, cryptogenic aneurysmal rupture in otherwise healthy adults. Early and accurate detection is essential in achieving optimal outcomes.

SUMMARY OF THE INVENTION

According to a first aspect, a computer implemented method for identification of an indication of at least one visual object in at least one anatomical image of a target individual, comprises: providing at least one anatomical image of a body portion of a target individual, inputting the at least one anatomical image into a classification component of a neural network (NN) and into a segmentation component of the NN, feeding a size feature into the classification component of the NN, wherein the size feature comprises an indication of a respective size of each at least one segmented visual object identified in the at least one anatomical image, the size feature computed according to segmentation data outputted by the segmentation component for each pixel element of the at least one anatomical image, and computing, by the classification component of the NN, an indication of at least one visual object in the at least one anatomical image.

According to a second aspect, a method of training a NN for identification of an indication of at least one visual object in at least one anatomical image of a target individual, comprises: providing a training dataset comprising at least one anatomical image for each of a plurality of sample individuals, wherein each at least one anatomical image is associated with per pixel element annotation indicative of a visual object, and training a NN end-to-end, to perform segmentation by a segmentation component and classification by a classification component according to a size feature computed based on output of the segmentation component and fed into the classification component, and according to a same training dataset fed to both the segmentation component and the classification component, wherein the size feature is computed according to an indication of a respective size of each at least one segmented visual object of a respective training image outputted by the segmentation component.

According to a third aspect, a system for identification of an indication of at least one visual object in at least one anatomical image of a target individual, comprises: a non-transitory memory having stored thereon a code for execution by at least one hardware processor, the code comprising: code for receiving at least one anatomical image of a body portion of a target individual, code for inputting the at least one anatomical image into a classification component of a neural network (NN) and into a segmentation component of the NN, code for feeding a size feature into the classification component of the NN, wherein the size feature comprises an indication of a respective size of each at least one segmented visual object identified in the at least one anatomical image, the size feature computed according to segmentation data outputted by the segmentation component for each pixel element of the at least one anatomical image, and code for computing, by the classification component of the NN, an indication of at least one visual object in the at least one anatomical image.

At least some of the systems, methods, apparatus, and/or code instructions described herein address the technical problem of increasing the accuracy of automatic classification of anatomical image(s), where the classification is indicative of one or more visual objects found within the anatomical image(s). The increase in accuracy by the automatic classification may, for example, flag acquired imaging studies for higher priority viewing by the radiologist, which may decrease time in diagnosing and/or treating potentially dangerous medical conditions. In another example, the increase in accuracy by the automatic classification may identify clinically significant visual objects as incidental findings in imaging studies acquired for other clinical indications. Such incidental findings may be missed by the reading physician for example, when focused on the clinical indication that led to the imaging study.

At least some of the systems, methods, apparatus, and/or code instructions described herein improve the technical field of automatic classification of anatomical images including at least one visual object. The improvement is at least based on the end-to-end training of the NN that includes the segmentation and classification components, where the estimated size (e.g., volume) of the segmented visual object outputted by the segmentation component is fed as the size feature into the classification component. The segmentation of the visual object is performed per pixel. The end-to-end training of both segmentation and classification components of the NN using the same training dataset generates a synergy in comparison to training two separate classifiers, and arranging the classifiers in a cascade where the segmentation classifier simply feeds into the classification classifier. For example, the accuracy of classification of the anatomical images obtained by the NN described herein is statistically significantly higher than the accuracy of classification obtained by other methods.

In a further implementation form of the first, second, and third aspects, the same at least one anatomical image is inputted simultaneously into to the segmentation component and the classification component.

In a further implementation form of the first, second, and third aspects, the classification component and the segmentation component share a common encoder component that receives the at least one anatomical image as input.

In a further implementation form of the first, second, and third aspects, a fully connected layer of the classification component receives the size feature outputted by the segmentation component and the output of the common encoder component, wherein the fully connected layer computes the indication of the at least one visual object in the at least one anatomical image.

In a further implementation form of the first, second, and third aspects, the segmentation component includes an additional decoder component that receives the output of the common component encoder.

In a further implementation form of the first, second, and third aspects, the common encoder component is implemented as a contracting path for extracting features, the decoder component is implemented as an expanding path for localization based on the features extracted by the encoder component, wherein features outputted by respective stages of the encoder component are fed as input into corresponding stages of the decoder component by skip connections.

In a further implementation form of the first, second, and third aspects, the size feature is computed by multiplying each of a plurality of per pixel element segmentation probabilities outputted by the segmentation component, by a volume associated with each pixel element to compute a plurality of sub-volumes, and summing the plurality of sub-volumes, wherein each segmentation probability is indicative of a respective probability of the respective pixel element indicative of the at least one visual object.

In a further implementation form of the first, second, and third aspects, the visual object is selected from the group consisting of: blood outside of blood vessels, intracranial hemorrhage, artificial implant, abnormal calcification outside of bones, abnormal non-blood fluid, air outside of lungs and/or digestive system, and tumor.

In a further implementation form of the first, second, and third aspects, the at least one anatomical image comprises a plurality of consecutive parallel slices obtained by a CT machine.

In a further implementation form of the first, second, and third aspects, the at least one anatomical image inputted into the NN includes a full resolution as outputted by the respective anatomical imaging machine that captured the at least one anatomical image.

In a further implementation form of the first, and third aspects, wherein the method further comprises and/or the system further comprises code for marking on the at least one anatomical image, an indication of a segmentation of the identified at least one visual object outputted by the segmentation component of the NN.

In a further implementation form of the first, second, and third aspects, the end-to-end training is performed according to a combined loss function comprising a classification loss component and a segmentation loss component.

In a further implementation form of the first, second, and third aspects, the classification loss component comprises a binary cross entropy loss function computed according to an analysis between a classification output and a ground truth classification, and wherein the segmentation loss component is computed according to an auxiliary binary cross entropy function computed according to an analysis between per pixel element segmentation output and a ground truth segmentation.

In a further implementation form of the first, second, and third aspects, prior to performing end-to-end training, training the NN further comprises training only the segmentation component of the NN according to the training dataset, and freezing the computed weights of the NN.

In a further implementation form of the first, second, and third aspects, prior to performing end-to-end training and after training only the segmentation component, the method further comprises training a fully connected layer of the classification component for computing the classification indicative of at least one visual object in at least one training anatomical image, wherein the fully connected layer of the classification component receives both the size feature computed according to output of the segmentation component and output of an encoder component common to both the segmentation component and the classification component.

In a further implementation form of the first, and third aspects, wherein the method further comprises and/or the system further comprises code for training a NN for identification of an indication of at least one visual object in at least one anatomical image of a target individual, comprising: code for accessing a training dataset comprising at least one anatomical image for each of a plurality of sample individuals, wherein each at least one anatomical image is associated with per pixel element annotation indicative of a visual object, and code for training a NN end-to-end, to perform segmentation by a segmentation component and classification by a classification component according to a size feature computed based on output of the segmentation component and fed into the classification component, and according to a same training dataset fed to both the segmentation component and the classification component, wherein the size feature is computed according to an indication of a respective size of each at least one segmented visual object of a respective training image outputted by the segmentation component.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF SPECIFIC EMBODIMENTS

Figure 1:
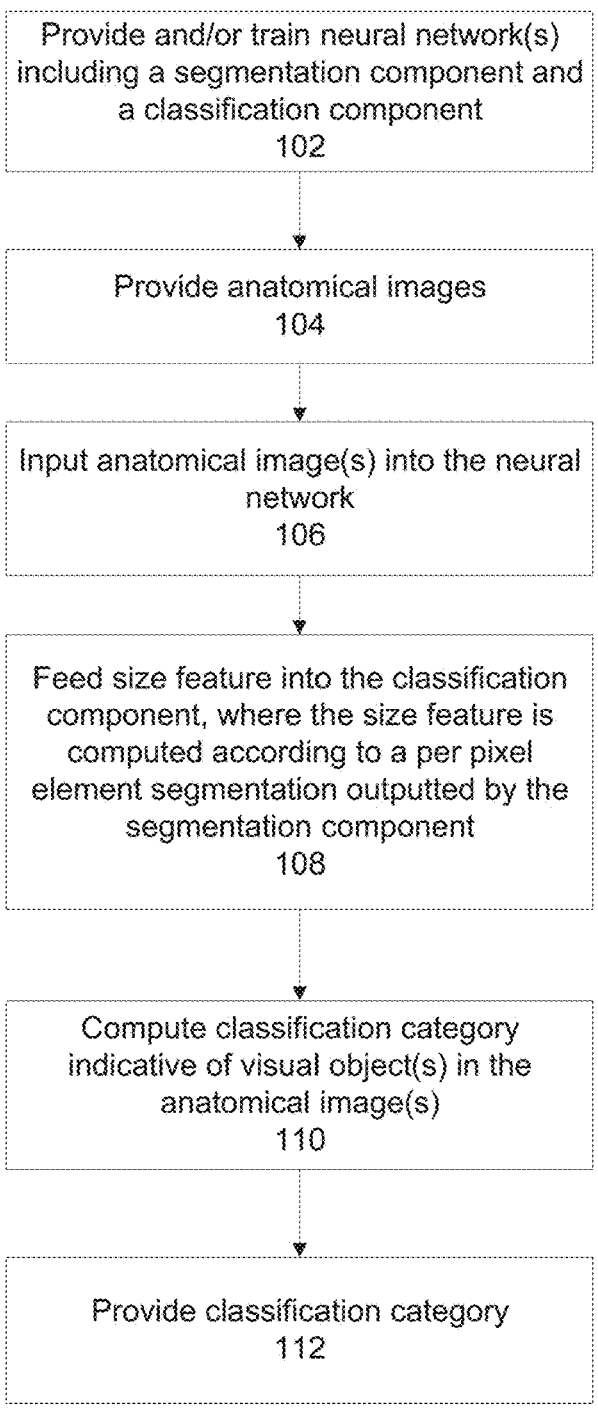
FIG. 1 is a flowchart of a method for automatic detection of visual object(s) in one or more anatomical images of a target individual by a trained neural network, in accordance with some embodiments of the present invention.

The present invention, in some embodiments thereof, relates to medical image processing and, more specifically, but not exclusively, to systems and methods for automated detection of visual objects in medical images.

As used herein, the term pixel element refers to a unit of the anatomical image, optionally the smallest unit used to represent the anatomical image, such as store the anatomical image and/or present the anatomical image on a display. Pixel elements may refer, for example, to individual pixels (i.e., data of the anatomical image defining each pixel presented on a screen), individual voxels (i.e., for 3D imaging data), groups of pixels (e.g., during downgrading of resolution), and/or groups of voxels.

As used herein the term visual object refers to a representation of a tangible object that is physically located within the target individual, when presented within the captured anatomical image. The visual object may be an abnormal object not normally present within the target individual, and/or a clinically significant object. Exemplary visual objects include: blood outside of blood vessels (e.g., intracranial hemorrhage (ICH)), artificial implant, abnormal calcification (e.g., external to bones, such as in the aorta), abnormal non-blood fluid (e.g., pulmonary edema), air (e.g., within tissue and outside of the lung and/or digestive system), and a tumor (e.g., benign, or malignant). It is noted that the visual object is indicative of an actual physical object, rather than a sign and/or diagnosis made based on features of the anatomical object. The visual object is capable of being segmented, by classifying certain pixel elements of the anatomical image as related to the visual object and optionally classifying other pixel elements of the anatomical image as not related to the visual object.

An aspect of some embodiments of the present invention relates to systems, an apparatus, methods, and/or code instructions (i.e., stored by a data storage device, executable by one or more hardware processors) for identification of an indication of visual object(s) in anatomical image(s) of a target individual, for example, identifying an indication of ICH in a sequence of head CT slices. The received anatomical image(s) are inputted, optionally simultaneously, into a classification component and a segmentation component of a neural network (NN). A size feature is fed into the classification component of the NN. The size feature is an indication of a respective size of each segmented visual object identified in the anatomical image. The size feature is computed according to segmentation data outputted by the segmentation component per pixel element of the inputted anatomical image(s). The classification component of the NN computes a classification category indicative of visual object(s) identified in the anatomical images.

It is noted that the size of the outputted segmented visual object(s) which is fed as a size feature into the classification component provides explicit segmentation information to support classification, in contrast to implicitly using the segmentation information as supervision data. Optionally, the segmentation is computed per pixel element, by computing a respective segmentation probability indicative of the respective pixel element being indicative of the visual object(s).

Optionally, the size of the segmented visual object is computed by multiplying each of the per pixel element segmentation probabilities outputted by the segmentation component by a size (e.g., volume) associated with each pixel element (e.g., volume) to generate a set of sub-volumes, and summing the sub-volumes.

An aspect of some embodiments of the present invention relates to systems, an apparatus, methods, and/or code instructions (i.e., stored by a data storage device, executable by one or more hardware processors) for training a NN for identification of an indication of visual object(s) in anatomical image(s) of a target individual, for example, identifying an indication of ICH in a sequence of head CT slices. The NN is trained according to a training dataset including anatomical image(s) for each of multiple sample individuals. Each anatomical image includes per pixel element annotation indicative of a visual object. For example, a radiologist manually marks a border around each ICH instance of each slide of a head CT scan. Pixels within the border are tagged as being indicative of ICH. Pixels outside the border may be tagged as not indicative of ICH. The NN is trained end-to-end, to perform segmentation by the segmentation component and to perform classification by the classification component according to the size feature computed based on output of the segmentation component, fed into the classification component. The NN is trained according to the same training dataset that is fed, optionally simultaneously, to both the segmentation component and the classification component of the NN.

Optionally, the end-to-end training is performed according to a combined loss function comprising a classification loss component and a segmentation loss component.

Optionally, prior to the end-to-end training, only the segmentation component of the NN is trained according to the training dataset. The computed weights from the training of the segmentation component are frozen. After training only the segmentation component, a fully connected layer of the classification component is trained to output a classification category indicative of the visual object(s) identified in the anatomical image(s), for example, a binary classifier that output whether the visual object(s) is present or not. The fully connected layer of the classification component receives as input both the size feature computed according to segmentation data outputted by the segmentation component and output of an encoder component common to both the classification component and the segmentation component. The NN is then trained end-to-end in a final training step.

At least some of the systems, methods, apparatus, and/or code instructions described herein address the technical problem of increasing the accuracy of automatic classification of anatomical image(s), where the classification is indicative of one or more visual objects found within the anatomical image(s). The increase in accuracy by the automatic classification may, for example, flag acquired imaging studies for higher priority viewing by the radiologist, which may decrease time in diagnosing and/or treating potentially dangerous medical conditions. In another example, the increase in accuracy by the automatic classification may identify clinically significant visual objects as incidental findings in imaging studies acquired for other clinical indications. Such incidental findings may be missed by the reading physician for example, when focused on the clinical indication that led to the imaging study.

At least some of the systems, methods, apparatus, and/or code instructions described herein improve the technical field of automatic classification of anatomical images including at least one visual object. The improvement is at least based on the end-to-end training of the NN that includes the segmentation and classification components, where the estimated size (e.g., volume) of the segmented visual object outputted by the segmentation component is fed as the size feature into the classification component. The segmentation of the visual object is performed per pixel. The end-to-end training of both segmentation and classification components of the NN using the same training dataset generates a synergy in comparison to training two separate classifiers, and arranging the classifiers in a cascade where the segmentation classifier simply feeds into the classification classifier. For example, the accuracy of classification of the anatomical images obtained by the NN described herein is statistically significantly higher than the accuracy of classification obtained by other methods.

At least some of the systems, methods, apparatus, and/or code instructions described herein address the technical problem of automatically identifying an ICH in one or more anatomical images that include at least a head of a target individual, for example, a set of head CT slices. Intracranial hemorrhage is a critical finding in standard Head imaging such as CT head imaging. Early and accurate detection is essential in achieving optimal patient outcomes, for example, allowing enough time to operate to stop the bleeding. Missed small bleeds may develop into large blood pools that clinically impact the patient. Automatic detection of ICH in head imaging studies is a challenging technical problem due to several reasons, for example, small bleeds which are clinically significant may be difficult to detect due to their small size, anatomical variations of the brain between subjects, other anatomical structures may be difficult to differentiate from blood, and blood at different stages appears differently (e.g., fresh red blood versus coagulated blood).

At least some of the systems, methods, apparatus, and/or code instructions described herein improve the technical field of automated analysis of anatomical images to identify visual objects, by performing an automated analysis of anatomical image(s) including at least the head of a target individual for detection of ICH. An artificial intelligence (AI) facilitated first read of brain images (e.g., CT brain scan) provides added-value by automated detection of bleeds, in particular subtle bleeds which might go unrecognized, and/or providing triage-service for sooner attention to imaging studies with such time-sensitive ICH findings.

At least some systems, methods, apparatus, and/or code instructions described herein improve the medical field of analyzing anatomical images to identify visual object(s). Using standard methods, a user (e.g., radiologist) manually examines the anatomical images to identify the visual object(s). It is noted that in many cases, such as CT scans, a large number of slices are generated. Such manual analysis is subjective, based on the individual radiologist looking at the anatomical images.

Two different radiologists looking at the same anatomical image may provide differing opinions regarding visual object(s), which may even contradict each other. The automated analysis of anatomical images by at least some systems, methods, apparatus, and/or code instructions described herein is not based on a simple coding of an existing manual process onto a computer. Rather, at least some systems, methods, apparatus, and/or code instructions described herein turn a subjective method into an objective, reproducible method based on the trained neural network code described herein. Inventors developed new steps that did not previously exist in the manual process, and do have not counterparts in the manual process, namely, training of the neural network code, and/or execution of the trained neural network code to automatically classify anatomical images with an indication of including visual object(s). At least the trained neural network code described herein provides objective, reproducible visual object identification results, which are not available using standard manual processes.

At least some of the systems, methods, apparatus, and/or code instructions described herein provide technical solutions to technical problems that are not solved by other systems and/or methods, and/or provide an improvement to the technology of automated ICH detection in comparison to other systems and/or methods.

For example, Kamal Jnawali, Mohammad R Arbabshirani, Navalgund Rao, and Alpen A Patel. *Deep 3d convolution neural network for ct brain hemorrhage classification*. In *Medical Imaging* 2018: *Computer-Aided Diagnosis*, volume 10575, page 105751C. *International Society for Optics and Photonics,* 2018. relates to performing ICH diagnosis based on a series of images. The potential of utilizing a very large amount of data is at the cost of relatively weak supervision, due to the high dimensionality of the input scan size. As described in the cited reference, a dataset of 40 k studies was assembled and preprocessed to a fixed input size. The data was then used for the training of a 3D convolution classification pipeline described by Shuiwang Ji, Wei Xu, Ming Yang, and Kai Yu. 3*d convolutional neural networks for human action recognition. IEEE transactions on pattern analysis and machine intelligence,* 35(1):221-231, 2013. The reported AUC result of a single model was 0.86, which is significantly lower than other results reported by other studies. Moreover, the described pipeline does not provide localization of the identified hemorrhage. In contrast, at least some of the systems, methods, apparatus, and/or code instructions described herein may utilize a much smaller training dataset, obtain relatively high classification accuracy over other studies (see Examples section below for results of an experiment performed by Inventor), and/or in some embodiments provide localization (i.e., segmentation) data indicative of the location of the identified hemorrhage in addition to the classification result.

In another example, Sasank Chilamkurthy, Rohit Ghosh, Swetha Tanamala, Mustafa Biviji, Norbert G Campeau, Vasantha Kumar Venugopal, Vidur Mahajan, Pooja Rao, and Prashant Warier. *Development and validation of deep learning algorithms for detection of critical findings in head Ct scans. arXiv preprint arXiv*: 1803.05854, 2018 relates to ICH diagnosis based on slices. The described approach is based on decoupling of the classification and segmentation tasks, in comparison to NN described herein which at least in some embodiments relates to a single architecture that simultaneously performs classification and segmentation. The pipeline based on two sequential networks is slower in comparison to at least some of embodiments of the NN described herein which is a single architecture that simultaneously performs both classification and segmentation. Moreover, Sasank Chilamkurthy et al. report an AUC of 0.9419 on classification. The results of Sasank Chilamkurthy et al. were obtained with at least 10 times more tagged studies used for training their classifier in comparison with the number of studies used to train the NN described herein. In addition, the NN described herein achieves a higher AUC than the classifier of Sasank Chilamkurthy et al. (see Examples section below for additional details of the experiments performed by Inventor).

In yet another example, Monika Grewal, Muktabh Mayank Srivastava, Pulkit Kumar, and Srikrishna Varadarajan. *Radnet: Radiologist level accuracy using deep learning for hemorrhage detection in ct scans.* In *Biomedical Imaging (ISBI 2018), 2018 IEEE 15th International Symposium on*, pages 281-284. *IEEE,* 2018, relate to ICH diagnosis based on slices. The described approaches require a long tagging effort due to tedious annotation of every slice in the series. As described in Sasank Chilamkurthy et al., the authors have utilized a large dataset of 6 k series tagged slice-wise by radiologist for training. To localize the findings, the authors have invested in additional pixel wise tagging to train a UNet architecture (described in Olaf Ronneberger, Philipp Fischer, and Thomas Brox. *U-net: Convolutional networks for biomedical image segmentation.* In *International Conference on Medical image computing and computer-assisted intervention*, pages 234-241. Springer, 2015) for segmenting the series. As described in Monika Grewal et al., the authors used auxiliary segmentation losses to leverage the pixel wise information and aggregated the 3D volumetric decision using LSTM. In contrast, at least some of the systems, methods, apparatus, and/or code instructions described herein train the neural network for segmentation and classification using a relatively small training dataset, significantly reducing the amount of required manual tagging to train the neural network for accurate segmentation and classification. At least some embodiments of the NN described herein outperform the RadNet based classifier in terms of classification performance, for example, as measured according to AUC. The increase in performance id due to the classification component which is explicitly dependent on the results of the segmentation component, as described herein (i.e., feeding the size feature computed according to output of the segmentation component into the classification component).

At least some of the systems, methods, apparatus, and/or code instructions described herein improve the performance of a computing device training a neural network for classification of visual objects in anatomical image(s). In some implementations the improvement in performance is obtained by a using significantly smaller number of tagged training images, for example, in comparison to other methods that require significantly larger number of tagged image to obtain a similar classification (e.g., in terms of accuracy, false positives, and/or false negatives). The improvement in performance may include, for example, relatively reduced processing time, relatively reduced storage requirements (e.g., storing fewer tagged training images), and/or relatively reduced processing hardware (e.g., processor(s)) utilization.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
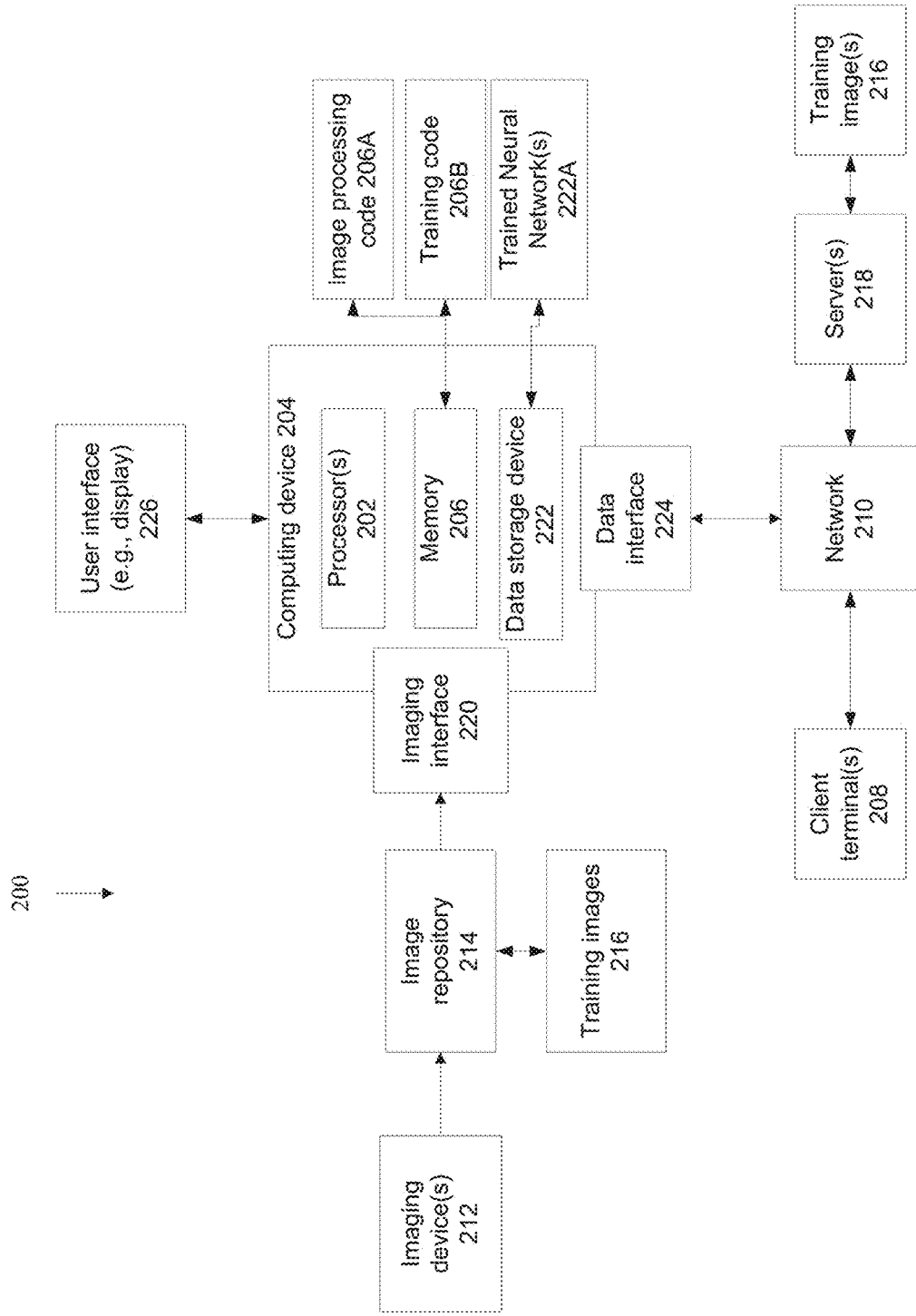
FIG. 2 is a block diagram of components of a system for automatic detection of visual object(s) in one or more anatomical images of a target individual, in accordance with some embodiments of the present invention.
Figure 3:
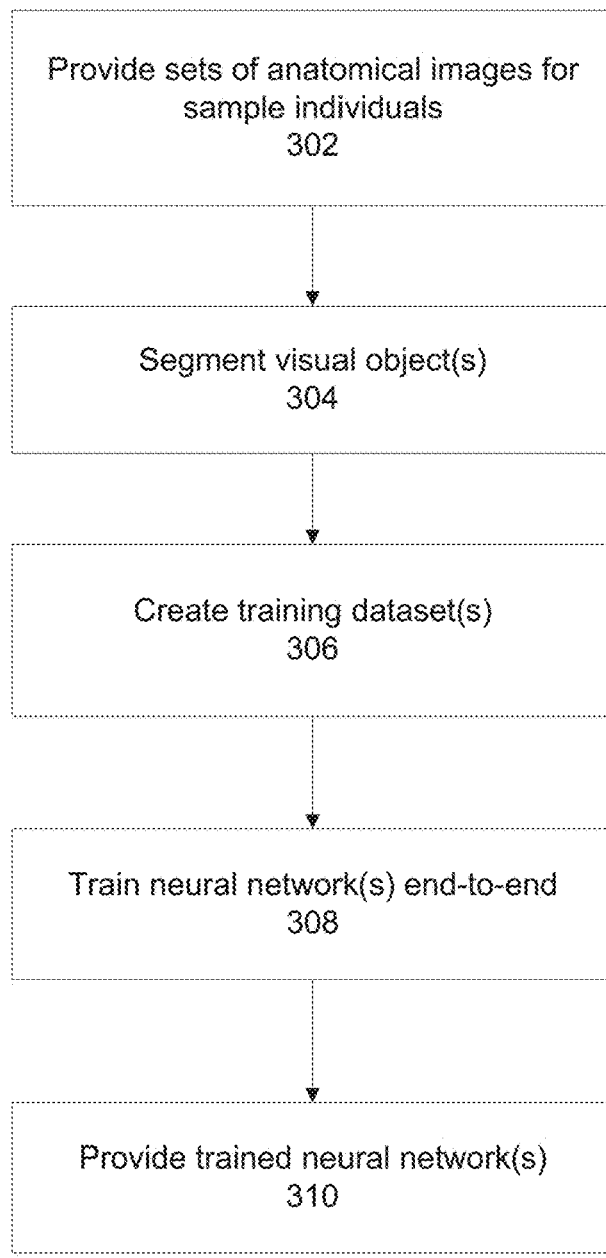
FIG. 3 is a flowchart of a method for training a neural network for automatic detection of visual object(s) in one or more anatomical images of a target individual, in accordance with some embodiments of the present invention.

Reference is now made to FIG. 1, which is a flowchart of a method for automatic detection of visual object(s) in one or more anatomical images of a target individual by a trained neural network, in accordance with some embodiments of the present invention. Reference is also made to FIG. 2, which is a block diagram of components of a system 200 for automatic detection of visual object(s) in one or more anatomical images of a target individual, in accordance with some embodiments of the present invention. Reference is also made to FIG. 3, which is a flowchart of a method for training a neural network for automatic detection of visual object(s) in one or more anatomical images of a target individual, in accordance with some embodiments of the present invention. System 200 may implement the acts of the method described with reference to FIG. 1 and/or FIG. 3, optionally by a hardware processor(s) 202 of a computing device 204 executing code instructions stored in a memory 206.

Computing device 204 may be implemented as, for example, a client terminal, a server, a virtual server, a radiology workstation, a virtual machine, a computing cloud, a mobile device, a desktop computer, a thin client, a Smartphone, a Tablet computer, a laptop computer, a wearable computer, glasses computer, and a watch computer. Computing 204 may include an advanced visualization workstation that sometimes is add-on to a radiology workstation and/or other devices for presenting indications of the identified visual object(s) and/or other computer added detections to the radiologist.

Computing device 204 may include locally stored software that performs one or more of the acts described with reference to FIG. 1 and/or FIG. 3, and/or may act as one or more servers (e.g., network server, web server, a computing cloud, virtual server) that provides services (e.g., one or more of the acts described with reference to FIG. 1 and/or FIG. 3) to one or more client terminals 208 (e.g., remotely located radiology workstations, remote picture archiving and communication system (PACS) server, remote electronic medical record (EMR) server) over a network 210, for example, providing software as a service (SaaS) to the client terminal(s) 208, providing an application for local download to the client terminal(s) 208, as an add-on to a web browser and/or a medical imaging viewer application, and/or providing functions using a remote access session to the client terminals 208, such as through a web browser.

Is it noted that the training of the neural network, and the application of the trained neural network to anatomical images to identify visual object(s), may be implemented by the same computing device 204, and/or by different computing devices 204, for example, one computing device 204 trains the neural network, and transmit the trained neural network to a server device 204.

Computing device 204 receives 2D images, and/or 2D slices (optionally extracted from 3D imaging data at parallel planes, for example extracted from a 3D computed tomography (CT) scan) captured by an anatomical imaging device(s) 212. Exemplary anatomical imaging device(s) 212 include: an ultrasound machine (e.g., 2D, 3D, 4D), an x-ray machine, a magnetic resonance imaging (MRI) device, and/or a CT machine. Anatomical images captured by imaging machine 212 may be stored in an image repository 214, for example, a storage server, a computing cloud, virtual memory, and a hard disk. Training images 216 may be created based on the captured anatomical images, as described herein.

Training images 216 are used to train the neural network, as described herein. It is noted that training images 216 may be stored by a server 218, accessibly by computing device 204 over network 210, for example, a publicly available training dataset, and/or a customized training dataset created for training the neural network, as described herein.

Anatomical images captured by imaging machine(s) 212 depict anatomical features and/or anatomical structures within a body portion of the target patient.

Computing device 204 may receive the training images 216 and/or anatomical images from imaging device 212 and/or image repository 214 using one or more imaging interfaces 220, for example, a wire connection (e.g., physical port), a wireless connection (e.g., antenna), a local bus, a port for connection of a data storage device, a network interface card, other physical interface implementations, and/or virtual interfaces (e.g., software interface, virtual private network (VPN) connection, application programming interface (API), software development kit (SDK)).

Hardware processor(s) 202 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 202 may include one or more processors (homogenous or heterogeneous), which may be arranged for parallel processing, as clusters and/or as one or more multi core processing units.

Memory 206 (also referred to herein as a program store, and/or data storage device) stores code instruction for execution by hardware processor(s) 202, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 206 stores code instructions for implementing trained neural network 222A. Memory 206 stores image processing code 206A that implements one or more acts and/or features of the method described with reference to FIG. 1, and/or training code 206B that executes one or more acts of the method described with reference to FIG. 3.

Computing device 204 may include a data storage device 222 for storing data, for example, a trained neural network 222A (as described herein), and/or training images 216. Data storage device 222 may be implemented as, for example, a memory, a local hard-drive, a removable storage device, an optical disk, a storage device, and/or as a remote server and/or computing cloud (e.g., accessed over network 210). It is noted that trained neural network 222A, and/or training images 216 may be stored in data storage device 222, with executing portions loaded into memory 206 for execution by processor(s) 202.

Computing device 204 may include data interface 224, optionally a network interface, for connecting to network 210, for example, one or more of, a network interface card, a wireless interface to connect to a wireless network, a physical interface for connecting to a cable for network connectivity, a virtual interface implemented in software, network communication software providing higher layers of network connectivity, and/or other implementations. Computing device 204 may access one or more remote servers 218 using network 210, for example, to download updated training images 216 and/or to download an updated version of image processing code 206A, training code 206B, and/or the trained neural network 222A.

Computing device 204 may communicate using network 210 (or another communication channel, such as through a direct link (e.g., cable, wireless) and/or indirect link (e.g., via an intermediary computing device such as a server, and/or via a storage device) with one or more of:

Client terminal(s) 208, for example, when computing device 204 acts as a server providing image analysis services (e.g., SaaS) to remote radiology terminals, for analyzing remotely obtained anatomical images.

Server 218, for example, implemented in association with a PACS, which may storage large numbers of anatomical images for analysis, for example, captured by an imaging machine of a radiology clinic.

Anatomical image repository 214 that stores training images 216 and/or anatomical images outputted by imaging device 212.

It is noted that imaging interface 220 and data interface 224 may exist as two independent interfaces (e.g., two network ports), as two virtual interfaces on a common physical interface (e.g., virtual networks on a common network port), and/or integrated into a single interface (e.g., network interface).

Computing device 204 includes or is in communication with a user interface 226 that includes a mechanism designed for a user to enter data (e.g., patient data) and/or view the indications of identified visual object(s). Exemplary user interfaces 226 include, for example, one or more of, a touchscreen, a display, a keyboard, a mouse, and voice activated software using speakers and microphone.

Referring now back to FIG. 1, at 102, the neural network(s) is provided and/or trained.

Multiple neural networks may be trained. Each neural network may be trained to process a certain set of anatomical images that include a certain body portion of the target individual. For example, neural networks may be trained according to anatomical imaging modality, for example, x-ray, ultrasound, CT, and MRI. In another example, neural networks may be trained according to dimensions of the image, for example, 2D images, 3D images. In another example, neural networks may be trained according to number of consecutive slides, for example, a single image (e.g., from any imaging modality), or multiple slides (e.g., of a CT and/or MRI scan), such as 2, 3, 4, 5, 7, or other number. In another example, neural networks may be trained according to the body portion, for example, head, chest, abdomen, and limb. In another example, neural networks may be trained according to administration of contrast or lack of administration of contrast, for example, head CT with contrast, and non-contrast head CT. In yet another example, neural networks may be trained according to additional processing features performed on the acquired images, for example, applying a CT bone window, and/or bone enhancing reconstruction. In yet another example, neural networks may be trained according to type of visual object(s).

The neural network may be selected from multiple available neural networks. The selection may be performed manually by the user (e.g., via a user interface, for example, displaying a menu and/or icons of available neural networks). The selection may be performed automatically by code that determines the image type according to imaging modality, and/or that determines administration of contrast or lack of administration of contrast, and/or that determines additional processing performed on the image, and/or according to scanned body portion and/or according to clinical indication. The automated analysis may be, for example, based on an analysis of the image itself, and/or an analysis of metadata of the image, and/or according to data associated with the image series (e.g., obtained from a PACS server, DICOM data, and/or electronic medical record).

The neural network includes a segmentation component and a classification component. A size of a segmented visual object of the anatomical image(s) computed by the segmentation component is fed as a size feature into the classification component. The neural network is trained end-to-end to perform both classification by classification component and segmentation by the segmentation component based on feeding the size feature computed based on segmentation data outputted by the segmentation component into the classification component, optional into the full connected layer of the classification component that receives both the size feature and output of an encoder shared by the classification and segmentation components. The end-to-end training is according to the same training dataset, which is fed to both the segmentation component and the classification component. The training dataset includes anatomical image(s) for each of multiple sample individuals, where visual object(s) appearing in the anatomical image(s) are segmented according to an annotation defined per pixel element.

An exemplary method of training the neural network(s) is described with reference to FIG. 3.

Figure 4:
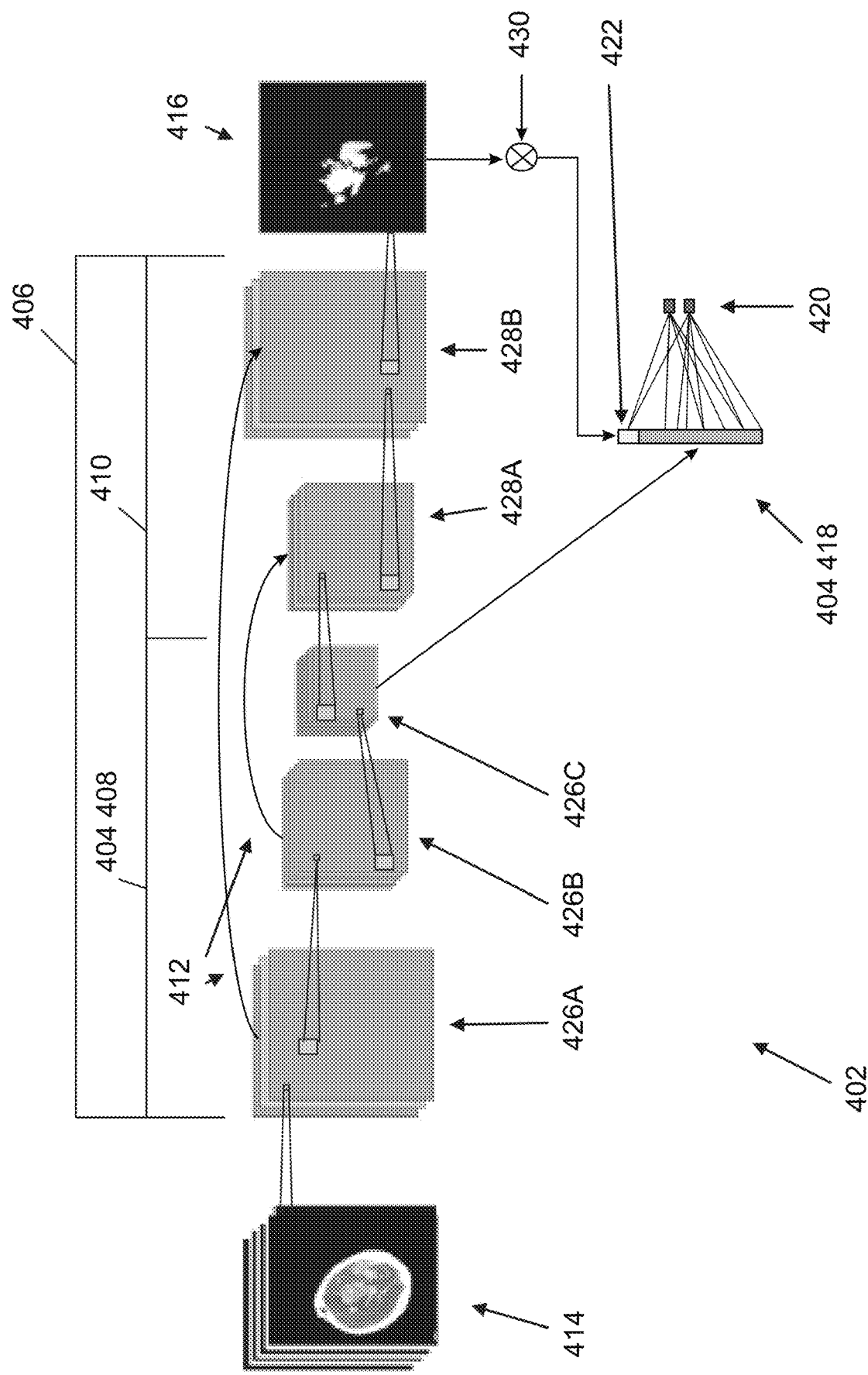
FIG. 4 is a block diagram of an exemplary architecture of the NN for identification of visual object(s) of one or more anatomical images, in accordance with some embodiments of the present invention.

Reference is now made to FIG. 4, which is a block diagram of an exemplary architecture of the NN 402 for identification of visual object(s) of one or more anatomical images, in accordance with some embodiments of the present invention. NN 402 includes a classification component 404 and a segmentation component 406. Classification component 404 and segmentation component 406 share a common encoder component 408. Classification component 404 include encoder component 408 and a fully connected layer 418. Common encoder component 408 receives one or more anatomical image(s) 414 as input. In an exemplary implementation, input anatomical images(s) 414 include five consecutive parallel slices (e.g., of a CT scan, such as head CT), each optionally having a uniform size, for example, 512×512.

Segmentation component 406 includes an additional decoder component 410, which receives the output of the common encoder component 408.

Common encoder component 408 may be implemented as a contracting path for extracting features. Common encoder component 408 may include multiple stages of filter layers 426. In an exemplary implementation, three filter layers 426A-C are used. A first filter layer 426A includes two 3×3 convolutional layers, 64@256×256. A second filter layer 426B includes two 3×3 convolutional layers, 128@ 128×128. A third filter layer 426C includes two 3×3 convolutional layers, 256@64×64. Decoder component 410 may be implemented as an expanding path for localization based on the features extracted by the encoder component 408. Decoder component 410 may include multiple stages of filter layers 428. In an exemplary implementation, two up sampling filter layers 428A-B are used. A first up sampling filter layer 428A includes a single 3×3 convolutional layer, 128 @ 128×128. A second up sampling filter layer 428B includes a single 3×3 convolutional layer, 64 @ 256×256. Output of respective stages of the encoder component 408 may be fed as input into corresponding stages of the decoder component 410 via skip connections 412. For example, output of filter 426A is fed into up sampling filter layer 428A, and output of filter 426B is fed into up sampling filter layer 428B.

Decoder component 410 outputs segmentation data 416 indicative of a segmentation of visual object(s) identified in anatomical image(s) 414. Segmentation data 416 includes a per pixel element segmentation, optionally a segmentation probability computed per pixel element, indicative of the probability of the respective pixel element denoting a visual object, as described herein. A size (e.g., volume) 430 of the segmented visual object is computed as described herein, by multiplying, for each pixel element, the corresponding segmentation probability by the size (e.g., volume) of the pixel element to compute multiple sub-sizes (e.g., sub-volumes), and summing the sub-sizes into a total size (e.g., total volume), for example, blood (i.e., ICH) in cubic millimeters.

The size 430 is fed as a size feature 422 into fully connected layer 418 of classification component 404. The fully connected layer 418, optionally the last layer of NN 402 and/or last layer of classification component 404, receives the output of common encoder component 408, optionally output of filter 426C, and the size feature 422. Filter layer 426C of encoder component 408 may perform feature wise pooling and flattening. Fully connected layer 418 computes a classification category result 420, for example, the classification category indicative of an identified visual object(s) or into the classification category indicative of no identified visual object(s). Fully connected layer 418 may be implemented as a Concat 257 layer followed by a FC 2 layer that outputs the final classification result.

Referring now back to FIG. 1, at 104, one or more anatomical images of a target individual are provided.

Optionally, a sequence of multiple consecutive slices, optional parallel, are provided. The multiple slices may overlap. The multiple slices may represent a 3D volume acquired by a 3D imaging modality, for example, CT, MRI, and 3D ultrasound. Alternatively, a single image is provided. The single image may be a single image captured by a 2D imaging modality, for example, an x-ray machine, or ultrasound scanner, or a single slice from a 3D imaging modality such as CT scanner.

Optionally, the anatomical image(s) included a full resolution as outputted by the respective anatomical imaging machine that captured the anatomical image(s). The anatomical image(s) do not necessarily require a reduction in resolution and/or size for input into the NN according to a defined input size requirement. Small visual objects may be identified in such full resolution anatomical images, where for example, such small visual objects are not visible and/or cannot accurately be detected in anatomical image(s) where the size and/or resolution is reduced.

The images may be obtained, for example, from a PACS server, an EMR server, from the anatomical imaging device, and/or from a storage device (e.g., portable storage medium, storage server). For example, anatomical images are automatically sent to analysis after capture by the imaging modality and/or once the images are stored.

Figure 5:
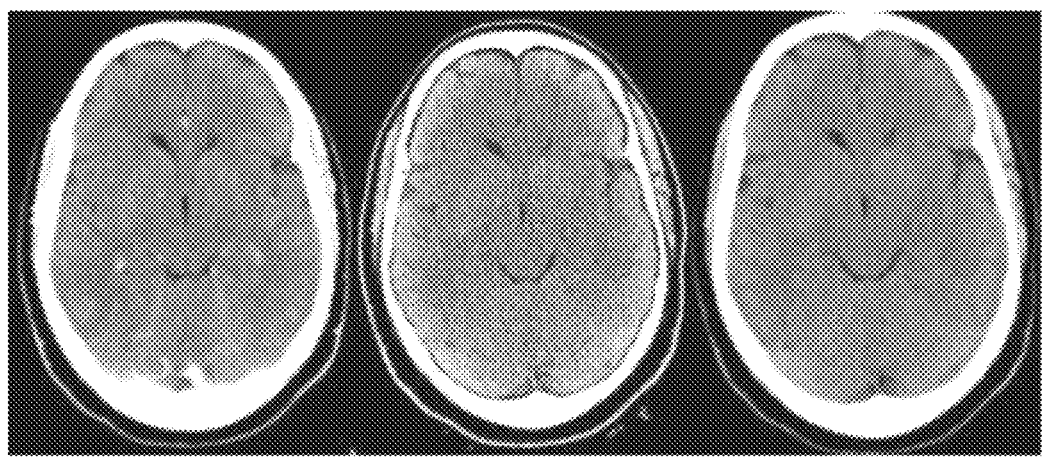
FIG. 5 is a schematic depicting examples of anatomical images for classification by the neural network, in accordance with some embodiments of the present invention.
Figure 5:
Figure 5:
Figure 5:

Reference is now made to FIG. 5, which is a schematic depicting examples of anatomical images for classification by the neural network, in accordance with some embodiments of the present invention. Images 502A-C include respective head CT slices acquired by a CT machine, using different parameters. Slice 502A is from a head CT series obtained with contrast administered to the target individual. Slice 502B is from a head CT series, where the image(s) is processed with bone enhancing reconstruction. Slice 502C is from a head CT series obtained with without contrast administered to the target individual (i.e., non-contrast head CT).

At 106, the anatomical image(s) are inputted into the NN.

The same anatomical image(s) are fed into the classification component of the NN and into the segmentation component of the NN. Optionally, the same anatomical image(s) is inputted simultaneously into both segmentation and classification component.

At 108, an indication of a size of a segmentation of visual object(s) of the anatomical image(s) is computed according to a per pixel element segmentation of visual object(s) computed by the segmentation component, and fed as a size feature into the classification component.

The size may be a volume such as when the anatomical image(s) include voxels and/or other 3D imaging data, or may be an area such as when the anatomical image(s) include pixels and/or other 2D imaging data.

The segmentation of visual object(s) outputted by the segmentation component is provided per pixel element of the anatomical image(s). Each pixel element of the anatomical image(s) is assigned a value indicating whether the respective pixel element is associated with the visual object(s). A value may be assigned to pixel elements indicative of non-associated with the visual object(s). The value assigned to each pixel element may be a segmentation probability indicative a computed probability that the respective pixel element is associated with the visual object(s).

Optionally, the size of the segmented visual object(s) is computed by multiplying each of the segmentation probabilities by a size associated with each pixel element, to compute multiple sub-sizes. For example, when each pixel element denotes a voxel, the sub-sizes are sub-volumes. When each pixel element denotes a pixel, the sub-sizes are sub-areas. The sub-sizes are summed, optionally over each of the anatomical images. When multiple consecutive slices (e.g., parallel) are fed into the NN, the total size is computed according to the sub-volumes of all the slices, obtaining an estimate of the total volume of the visual object(s).

Different pixel elements of different image storage systems and/or different displays may correlate to different physical sizes in the real world. The size associated with each pixel elements standardizes the computed size to an actual real world size, for example, in square millimeters, and/or in cubic millimeters.

At 110, an indication of the visual object(s) in the at least one anatomical image is computed. The indication includes at least a classification category indicative of visual object(s) in the anatomical image(s) outputted by the classification component. The indication may include the segmentation outputted by the segmentation component. The classification category may be, for example, a binary category indicative of the presence or absence of the visual object(s) in the anatomical image(s), and/or a multi-category classification indicative of the type of visual object(s) found in the anatomical image(s). The segmentation may include a per pixel element segmentation probability, which may be evaluated according to a threshold, where probability values above the threshold are included in the segmentation and values below the threshold are excluded from the segmentation.

The indication of the visual object(s) is computed by a last fully connected layer of the NN that receives input from both the segmentation component and the classification component.

Optionally, the fully connected layer computes a classification category indicative of the identified visual object(s). The fully connected layer may be a final component of the classification component, and not of the segmentation component. The fully connected layer receives as input the size feature computed according to per pixel segmentation data outputted by the segmentation component, and output of an encoder component that is shared by both the classification component and the segmentation component.

At 112, the indication of the visual object(s) is provided. At least the classification category is provided.

The indication of the classification may be provided as text, and/or code, indicating the classification category of the visual object(s), for example, present, absent, and/or type of visual object(s).

The indication of the segmentation may include a marking on the anatomical image(s) corresponding to the pixel elements identified as being segmented. For example, a border surrounding the segmented pixel elements may be marked, optionally using a different color. In another example, the selected pixel elements are color coded with a unique color relative to the rest of the image, for example, in yellow, red, green, blue, or other colors. In another example, an indication of localization of the segmentation is outputted, for example, coordinates of one or more of the segmented pixels.

Figure 6:
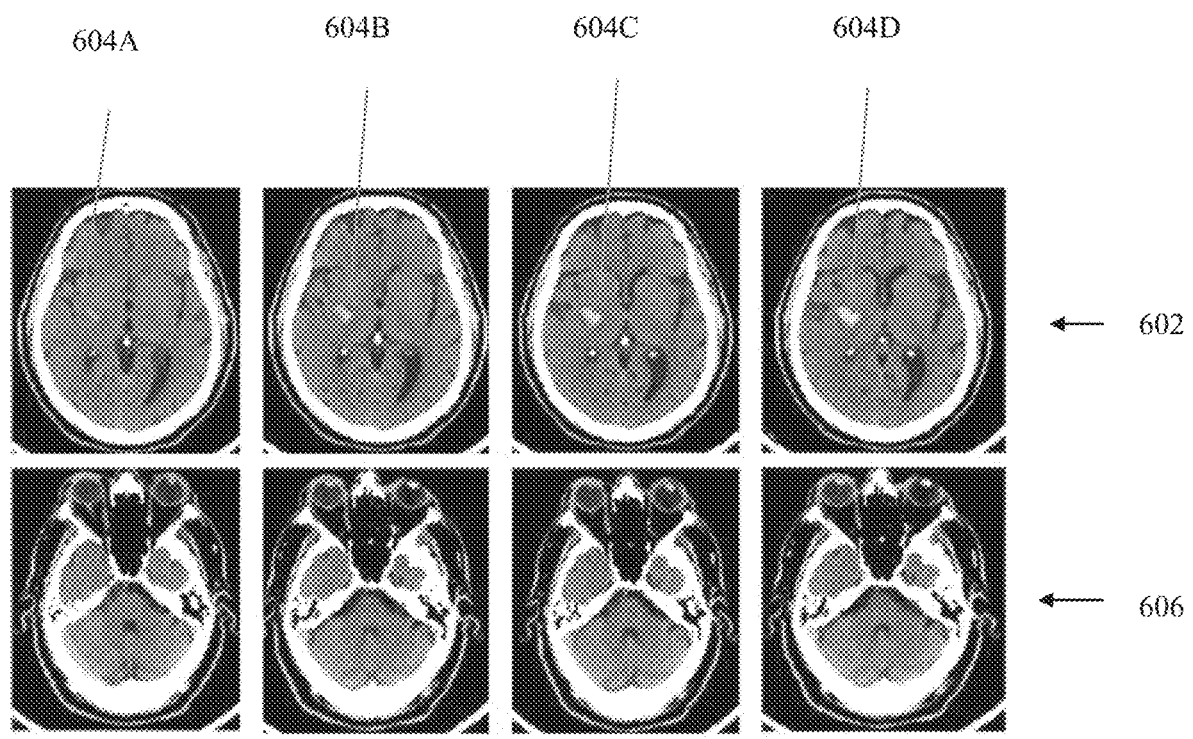
FIG. 6 is a sequence of brain CT slices, depicting respective parenchymal hemorrhages, and another sequence of brain CT slices without ICH but appearing as artifacts that may be mistaken for ICH, in accordance with some embodiments of the present invention.

Reference is now made to FIG. 6, which is a sequence of brain CT slices 602, depicting respective parenchymal hemorrhages 604A-D, and another sequence of brain CT slices 606 without ICH but appearing as artifacts that may be mistaken for ICH, in accordance with some embodiments of the present invention. The images depicted in FIG. 6 indicate the improvement to automated detection of ICH obtained by the neural network described herein based on per pixel element classification of the ICH. The use of the size feature computed according to per pixel classification performed by the segmentation component, which is fed as the size feature into the classification component, takes into account context, such as location within the brain, to increase the accuracy of differentiating between hemorrhages 604A-D and artifacts of slices 606.

Figure 7:
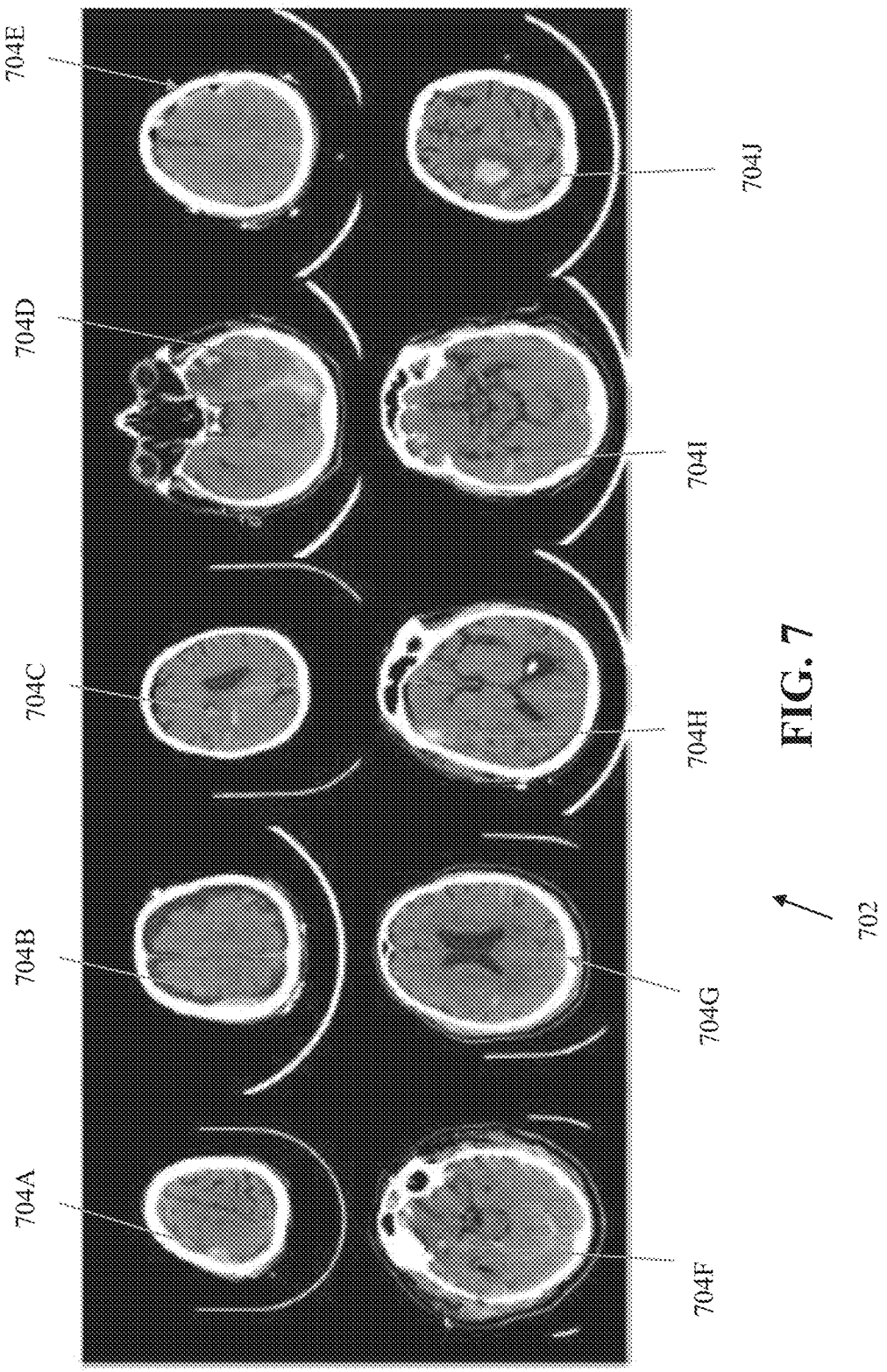
FIG. 7 is an example of brain CT slices each of a respective series for which a high probability of ICH was computed by the trained neural network, in accordance with some embodiments of the present invention.

Reference is now made to FIG. 7, which is an example of brain CT slices 702 each of a respective series for which a high probability of ICH was computed by the trained neural network, in accordance with some embodiments of the present invention. The brain CT series was analyzed as part of the validation set of the experiment conducted by Inventors, as described below in additional detail in the "Examples" section. Some examples of ICH that are visible in the images are marked with respective call out numbers 704A-J.

Figure 8:
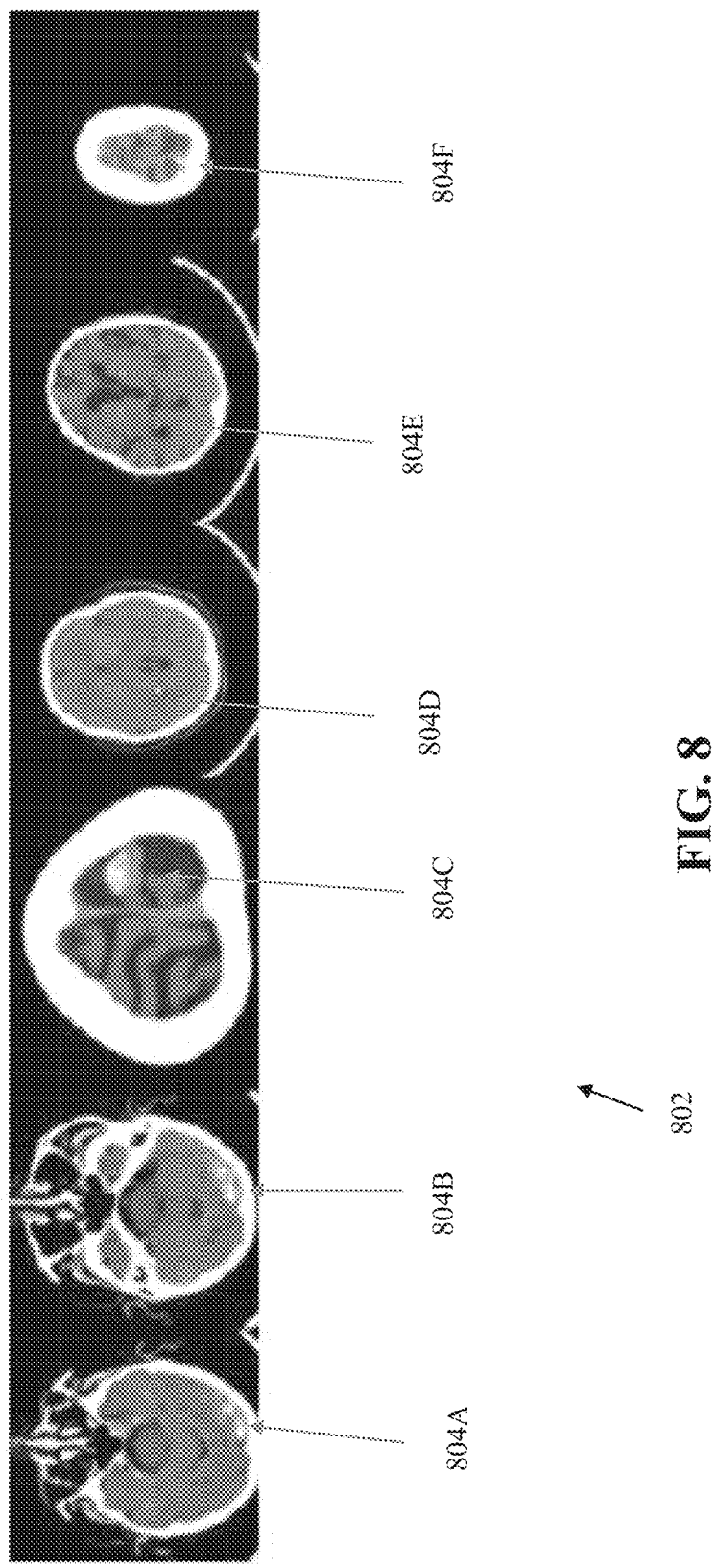
FIG. 8 is an example of brain CT slices including artifacts that may be incorrectly identified as ICH, in accordance with some embodiments of the present invention.

Reference is now made to FIG. 8, which is an example of brain CT slices 802 including artifacts that may be incorrectly identified as ICH, in accordance with some embodiments of the present invention. The incorrect identification of the artifacts as ICH may be reduced by including training images where such artifacts are segmented per pixel and annotated with a corresponding tag indicative of the artifact, as described herein. Exemplary artifacts that may be segmented per pixel to reduce or avoid being incorrectly identified as ICH include mengiomas and calcifications. A high probability of ICH was incorrectly computed in the experiment described in the "Examples" section, however such incorrect computation is resolvable by including images with per pixel element segmentation of similar artifacts in the training dataset, as described herein. Some examples of artifacts that may be per pixel segmented to reduce of avoid being incorrectly classified as ICH are marked with respective call out numbers 804A-F.

Figure 9:
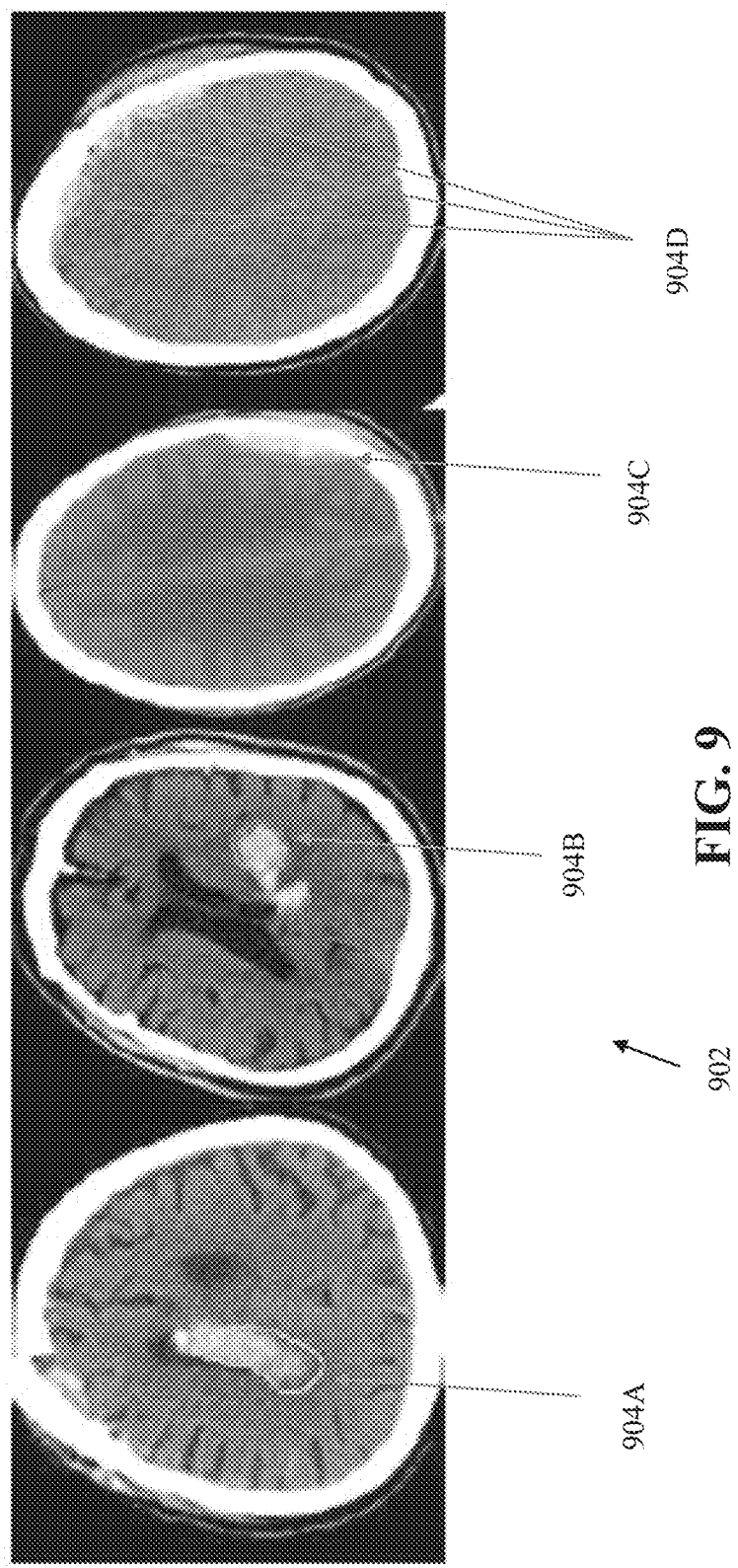
FIG. 9 is example of brain CT slices each including a respective indication of a segmentation of ICH computed by the trained neural network, in accordance with some embodiments of the present invention.

Reference is now made to FIG. 9, which is an example of brain CT slices 902 each including a respective indication of a segmentation of ICH 904A-D computed by the trained neural network, in accordance with some embodiments of the present invention.

Referring now back to FIG. 3, at 302, sets of anatomical images are provided for each of multiple sample individuals. Each set of anatomical images, which represents a respective image capture session, includes one or more images of a body portion of the respective sample individual. Each set of anatomical images may include a single image, or multiple images arranged as a consecutive sequence of slices. The imaging data may be represented in 2D (e.g., pixels) and/or 3D (e.g., voxels) and/or 2D extracted from 3D (e.g., slices of a volume).

The anatomical images do not necessarily include visual findings, for example, some sets of anatomical images do not include any visual findings. Other anatomical images that do include visual findings may include, for example, a single visual finding, multiple visual findings of the same type (e.g., multiple ICH appearing in different locations of the same slice of head CT), and/or multiple visual findings each of different type (e.g., one or more ICH and one or more tumors appearing in different locations of the same slice of head CT).

At 304, visual objects identified within each of the anatomical images are segmented. The segmentation is performed per pixel element (e.g., per pixel, per voxel), but designating all pixel elements associated with each respective visual object as being segmented. Other pixel elements not associated with visual object(s) may be segmented by being designated as not-associated with visual object(s).

The segmentation may be performed manually, for example, by a trained radiologist. For example, using a graphical user interface (GUI) to draw a border around the visual object(s), and/or shade-in the visual object(s), and/or other methods of selection of pixel elements associated with the visual object(s).

The segmentation process may include assigning a tag to each segmented visual object indicative of the type of the segmented visual object, for example, ICH, tumor, calcification, and artificial implant. Such tags may be assigned when the neural network is being trained to recognize multiple different types of visual objects.

The segmentation data may be stored, for example, pixel element data, an overlaid image, as metadata, a vector, an array, or other suitable data structure. For example, the segmentation data may be stored as an image mask and/or image overlay over the anatomical image, where pixel elements of the anatomical image located within the image mask and/or image overlay are segmented, and pixel elements located outside of the image mask and/or image overlay are non-segmented. The image overlay and/or image mask may include, for example, a border defining the boundaries of the segmented visual object (i.e., pixel elements inside the border are segmented and pixel elements outside the border are non-segmented), or a solid region (i.e., pixel elements corresponding to the solid region are segmented and pixel elements not corresponding to the solid region are non-segmented). In another example, a two dimensional array having a size corresponding to the number of pixel elements stores a binary value indicative of whether a respective pixel element corresponding to a respective cell of the 2D array is segmented or not, for example, 1 or TRUE=segmented, and 0 or FALSE=non-segmented. In another example, cells of a 2D array may store the type of the segmented visual object.

The segmentation data also represents classification data. Anatomical images with segmentation data have a classification indicating the presence of visual finding(s) within the anatomical images, optionally according to type of visual object(s) according to the segmentation data. As such, the classification data extracted from the segmentation data is used for training the classification component of the NN.

The classification data may be automatically derived from the segmentation data. For example, code may assign a classification tag to anatomical images with one or more segmented visual findings. The classification tag may include the type of visual finding(s) in the anatomical image, which may be extracted from the segmentation data. Alternatively or additionally, the classification data is manually created, for example, by the user manually assigning a tag to the anatomical image, for example, indicating presence or absence of visual finding and/or type of visual finding.

At 306, one or more training datasets are created for training one or more neural networks. Each training dataset includes sets of anatomical images and associated segmented data, which includes classification data.

Training datasets are created according to the target neural network, by including the relevant anatomical images. For example, to train a classifier to detect ICH, head CT scans including segmented ICH visual objects are selected for creation of the training dataset.

At 308, one or more NNs are trained according to the created training dataset(s).

Each NN is trained to identify visual object(s) in anatomical images. The identification may include a classification of whether the anatomical image(s) include visual object(s), and/or optionally not including visual object(s). Alternatively or additionally, the identification may include a segmentation of the visual object(s) identified in the anatomical image(s).

Each NN includes a segmentation component and a classification component. Both segmentation component and classification component are trained according to the same the training dataset, optionally by simultaneously feeding the same training dataset to both the segmentation component and the classification component.

The training is performed end-to-end, by training the neural network to perform both classification by the classification component and segmentation by the segmentation component, and according to the size feature which is computed based on segmentation data outputted by the segmentation component and fed into the fully connected layer of the classification component. The same training dataset is inputted into both the segmentation component and the classification component. The training is performed based on an indication of a size of each segmented visual object outputted by the segmentation component being fed as a size feature into the classification component.

Optionally, the end-to-end training is performed according to a combined loss function comprising a classification loss component and a segmentation loss component. The classification loss component may include a binary cross entropy loss function. The binary cross entropy loss function is computed according to an analysis between a classification output of the classification component of the NN and a ground truth classification according to the manual segmentation. The segmentation loss component may be computed according to an auxiliary binary cross entropy function. The auxiliary binary cross entropy function may be computed according to an analysis between per pixel element segmentation output of the segmentation component of the NN and a ground truth segmentation according to the manual segmentation.

An exemplary combined loss function is mathematically represented as:

$$L = (1-\lambda) L_{classification} + \lambda \cdot L_{segmentation}$$

where:
L denotes the combined loss function,
$L_{classification}$ denotes the classification loss component,
$L_{segmentation}$ denotes the segmentation loss component, λ denotes a proportionate weight assigned to the classification and segmentation loss components, $$L_{classification} = \frac{1}{m}\sum_{i=1}^{m} CE(y_i, \hat{y}_i)$$

$y_i$ denotes the ground truth label,
$\hat{y}_i$ denotes the prediction of the ith sample;

$$L_{segmentation} = \frac{1}{m \cdot h \cdot w}\sum_{i=1}^{m}\sum_{j=1}^{h}\sum_{k=1}^{w} CE(y_{ijk}, \hat{y}_{ijk})$$

h denotes the height of the input image,
w denotes the width of the input image
$y_{ijk}$ denotes the pixel element in the spatial position j, k of the ith sample, $CE(y,\hat{y}) = y \log \hat{y} + (1-y) \cdot \log(1-\hat{y})$, and CE denotes the binary cross entropy function.

Optionally, as a first training step, prior to performing the end-to-end training, only the segmentation component of the NN is trained according to the training dataset. The computed weights of the NN are frozen.

Optionally, as a second training step, after the first training step and prior to the end-to-end training, the last fully connected layer of the classification component of the NN is trained for classification. The fully connected layer is not a component of the segmentation layer. The fully connected layer computes a classification category indicative of the visual object(s) identified in the inputted anatomical image(s), for example, into a category of TRUE indicative of one or more visual object(s) identified in the inputted anatomical image(s), or optionally FALSE indicative of no visual object(s) identified in the anatomical image(s). The last fully connected layer of the classification component receives both the size feature and output of the encoder component common to both the segmentation component and the classification component.

At 310, the trained NN(s) is provided. The trained NN may be locally stored by the computing device, and/or forwarded to the computing device when the training is performed by another device.

Various embodiments and aspects of the present invention as delineated hereinabove and as claimed in the claims section below find calculated support in the following examples.

EXAMPLES

Reference is now made to the following examples of training the neural network and detecting visual objects by the trained neural network, which together with the above descriptions illustrate some implementations of the systems, methods, apparatus, and/or code instructions described herein in a non limiting fashion.

Inventors performed a computational evaluation according to the systems and/or methods and/or apparatus and/or code instructions described herein, based on the features and/or system components discussed with reference to FIGS. 1-3.

The computational evaluation was performed for training the NN to identify indications of ICH in head CT scans.

For creation of the training dataset and for validation of the trained neural network, a dataset of 170 non-contrast CT brain studies with ICH-positive radiology reports were reviewed by at least one expert radiologist to confirm and manually segment the described ICH. An ICH-negative dataset included 102 CTs was assembled. The CT studies were acquired from multiple hospitals. Testing was performed on two datasets totaling 1,426 expert-validated studies, including an enriched (67% ICH positive) and randomly sampled (16% positive) set. The datasets used in the described computational evaluation (also referred to as experiment) are summarized in Table 1 below, where the value in each cell indicates a number of series.

TABLE 1

|  | Train | Validation | Test Enriched | Test Pop. |
|---|---|---|---|---|
| Positive | 123 | 47 | 406 | 133 |
| Negative | 102 | — | 202 | 685 |

The neural network was trained as described with reference to FIG. 3. Training was performed using λ=0, λ=1, λ=0.5 in respect, using Adam, and with learning rate of 1e-4.

Algorithmic performance for classification achieved AUCs of 0.9493 for the enriched and 0.9566 for the random-distribution test sets. A manual review of false positives showed propensity to aberrantly misclassify calcified hemangiomas, dystrophic parenchymal calcifications and basal ganglial calcifications. The results indicate that different sub-categories of ICH display various levels of difficulty with regard to algorithmic detection. Further training will likely substantially improve performance, especially when training data is enhanced for hyperdense anatomy such as meningiomas. Such further training may be performed by per pixel segmentation of the visual objects identified as false positives.

In another experiment, inventors compared the performance of the NN described herein to a baseline neural network classifier trained based on ResNet50, which is a commonly available, standard, neural network classifier. The AUC obtained for the validation set according to the NN described was 0.9602, which was higher than the AUC obtained for the validation set according to ResNet50 of 0.916.

The experimental results indicate that an automated analysis of non-contrast CT brain based on the systems, methods, apparatus, and/or code instructions described herein including the NN described herein achieves good results based upon a relatively small training dataset. Moreover, the experimental results indicate that the NN described herein achieves increased accuracy of classification of visual object(s) in anatomical images in comparison to a baseline standard neural network classifier.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant anatomical images will be developed and the scope of the term anatomical image is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A computer implemented method for identification of an indication of at least one visual object in at least one anatomical image of a target individual, comprising:

providing at least one anatomical image of a body portion of a target individual;

inputting the at least one anatomical image into a classification component of a neural network (NN) and into a segmentation component of the NN;

feeding a size feature into the classification component of the NN, wherein the size feature comprises an indication of a respective size of each at least one segmented visual object identified in the at least one anatomical image, the size feature computed according to segmentation data outputted by the segmentation component for each pixel element of the at least one anatomical image, wherein the size feature is computed by multiplying each of a plurality of per pixel element segmentation probabilities outputted by the segmentation component, by a volume associated with each pixel element to compute a plurality of sub-volumes, and summing the plurality of sub-volumes, wherein each segmentation probability is indicative of a respective probability of the respective pixel element indicative of the at least one visual object; and computing, by the classification component of the NN, an indication of at least one visual object in the at least one anatomical image.

2. The method of claim 1, wherein the same at least one anatomical image is inputted simultaneously into to the segmentation component and the classification component.

3. The method of claim 2, wherein the classification component and the segmentation component share a common encoder component that receives the at least one anatomical image as input.

4. The method of claim 3, wherein a fully connected layer of the classification component receives the size feature outputted by the segmentation component and the output of the common encoder component, wherein the fully connected layer computes the indication of the at least one visual object in the at least one anatomical image.

5. The method of claim 3, wherein the segmentation component includes an additional decoder component that receives the output of the common component encoder.

6. The method of claim 5, wherein the common encoder component is implemented as a contracting path for extracting features, the decoder component is implemented as an expanding path for localization based on the features extracted by the encoder component, wherein features outputted by respective stages of the encoder component are fed as input into corresponding stages of the decoder component by skip connections.

7. The method of claim 1, wherein the visual object is selected from the group consisting of: blood outside of blood vessels, intracranial hemorrhage, artificial implant, abnormal calcification outside of bones, abnormal non-blood fluid, air outside of lungs and/or digestive system, and tumor.

8. The method of claim 1, wherein the at least one anatomical image comprises a plurality of consecutive parallel slices obtained by a CT machine.

9. The method of claim 1, wherein the at least one anatomical image inputted into the NN includes a full resolution as outputted by the respective anatomical imaging machine that captured the at least one anatomical image.

10. The method of claim 1, further comprising marking on the at least one anatomical image, an indication of a segmentation of the identified at least one visual object outputted by the segmentation component of the NN.

11. A method of training a NN for identification of an indication of at least one visual object in at least one anatomical image of a target individual, comprising:
providing a training dataset comprising at least one anatomical image for each of a plurality of sample individuals, wherein each at least one anatomical image is associated with per pixel element annotation indicative of a visual object; and
training a NN end-to-end, to perform segmentation by a segmentation component and classification by a classification component according to a size feature computed based on output of the segmentation component and fed into the classification component, and according to a same training dataset fed to both the segmentation component and the classification component, wherein the size feature is computed according to an indication of a respective size of each at least one segmented visual object of a respective training image outputted by the segmentation component,
wherein the size feature is computed by multiplying each of a plurality of per pixel element segmentation probabilities outputted by the segmentation component, by a volume associated with each pixel element to compute a plurality of sub-volumes, and summing the plurality of sub-volumes, wherein each segmentation probability is indicative of a respective probability of the respective pixel element indicative of the at least one visual object.

12. The method of claim 11, wherein the end-to-end training is performed according to a combined loss function comprising a classification loss component and a segmentation loss component.

13. The method of claim 12, wherein the classification loss component comprises a binary cross entropy loss function computed according to an analysis between a classification output and a ground truth classification, and wherein the segmentation loss component is computed according to an auxiliary binary cross entropy function computed according to an analysis between per pixel element segmentation output and a ground truth segmentation.

14. The method of claim 11, wherein prior to performing end-to-end training, training the NN further comprises training only the segmentation component of the NN according to the training dataset, and freezing the computed weights of the NN.

15. The method according to claim 14, wherein prior to performing end-to-end training and after training only the segmentation component, the method further comprises training a fully connected layer of the classification component for computing the classification indicative of at least one visual object in at least one training anatomical image, wherein the fully connected layer of the classification component receives both the size feature computed according to output of the segmentation component and output of an encoder component common to both the segmentation component and the classification component.

16. A system for identification of an indication of at least one visual object in at least one anatomical image of a target individual, comprising:
a non-transitory memory having stored thereon a code for execution by at least one hardware processor, the code comprising:
code for receiving at least one anatomical image of a body portion of a target individual;
code for inputting the at least one anatomical image into a classification component of a neural network (NN) and into a segmentation component of the NN;
code for feeding a size feature into the classification component of the NN, wherein the size feature comprises an indication of a respective size of each at least one segmented visual object identified in the at least one anatomical image, the size feature computed according to segmentation data outputted by the segmentation component for each pixel element of the at least one anatomical image;
code for training a NN for identification of an indication of at least one visual object in at least one anatomical image of a target individual, comprising:
code for accessing a training dataset comprising at least one anatomical image for each of a plurality of sample individuals, wherein each at least one anatomical image is associated with per pixel element annotation indicative of a visual object; and
code for training a NN end-to-end, to perform segmentation by a segmentation component and classification by a classification component according to a size feature computed based on output of the segmentation component and fed into the classification component, and according to a same training dataset fed to both the segmentation component and the classification component, wherein the size feature is computed according to an indication of a respective size of each at least one segmented visual object of a respective training image outputted by the segmentation component; and
code for computing, by the classification component of the NN, an indication of at least one visual object in the at least one anatomical image
wherein the size feature is computed by multiplying each of a plurality of per pixel element segmentation probabilities outputted by the segmentation component, by a volume associated with each pixel element to compute a plurality of sub-volumes, and summing the plurality of sub-volumes, wherein each segmentation probability is indicative of a respective probability of the respective pixel element indicative of the at least one visual object.

* * * * *